US010217286B1

(12) United States Patent
Angel et al.

(10) Patent No.: US 10,217,286 B1
(45) Date of Patent: Feb. 26, 2019

(54) REALISTIC RENDERING FOR VIRTUAL REALITY APPLICATIONS

(71) Applicant: Amazon Technologies, Inc., Reno, NV (US)

(72) Inventors: Justin-Josef Angel, San Francisco, CA (US); Eric Alan Breitbard, Oakland, CA (US); Colin Neil Swann, San Francisco, CA (US); Robert Steven Murdock, Fairfax, CA (US)

(73) Assignee: Amazon Technologies, Inc., Reno, NV (US)

( * ) Notice: Subject to any disclaimer, the term of this patent is extended or adjusted under 35 U.S.C. 154(b) by 352 days.

(21) Appl. No.: 14/859,984

(22) Filed: Sep. 21, 2015

(51) Int. Cl.
| | |
|---|---|
| *G06T 19/00* | (2011.01) |
| *G02B 27/01* | (2006.01) |
| *G06F 3/01* | (2006.01) |
| *G06K 9/00* | (2006.01) |
| *G06F 3/0346* | (2013.01) |
| *G06T 7/40* | (2017.01) |
| *G06K 9/46* | (2006.01) |
| *G06K 9/62* | (2006.01) |

(52) U.S. Cl.
CPC ........ *G06T 19/006* (2013.01); *G02B 27/0172* (2013.01); *G06F 3/012* (2013.01); *G06F 3/013* (2013.01); *G06F 3/0346* (2013.01); *G06K 9/0061* (2013.01); *G06K 9/00255* (2013.01); *G06K 9/00281* (2013.01); *G06K 9/00302* (2013.01); *G06K 9/4652* (2013.01); *G06K 9/6201* (2013.01); *G06T 7/408* (2013.01)

(58) Field of Classification Search
CPC .............................. G06T 19/006; G06T 7/408
USPC ........................................................ 345/633
See application file for complete search history.

(56) References Cited

U.S. PATENT DOCUMENTS

| | | | | |
|---|---|---|---|---|
| 2003/0169917 A1* | 9/2003 | Ishiyama | ........... | G06K 9/00201 382/154 |
| 2003/0218672 A1* | 11/2003 | Zhang | ..................... | H04N 7/144 348/14.16 |
| 2010/0007665 A1* | 1/2010 | Smith | ..................... | G06T 13/40 345/473 |

(Continued)

OTHER PUBLICATIONS

"Virtual nose may reduce simulator sickness in video games" Mar. 2015, Purdue university, David whittinghill.*

(Continued)

*Primary Examiner* — Javid A Amini
(74) *Attorney, Agent, or Firm* — Hogan Lovells US LLP

(57) ABSTRACT

Motion sickness resulting from use of a virtual reality headset can be mitigated by displaying a virtual nose in the field of view of the user. Nose data can be obtained by a user selecting various options, or determined dynamically using various image analysis algorithms. Image data captured of the user's face can be data analyzed to determine aspects such as the size, shape, color, texture, and reflectivity of the user's nose. A three-dimensional nose model is generated, which is treated as an object in the virtual world and can have lighting, shadows, and textures applied accordingly. The pupillary distance can be determined from the image data and used to determine the point of view from which to render each nose portion. Changes in lighting or expression can cause the appearance of the nose to change, as well as the level of detail of the rendering.

20 Claims, 8 Drawing Sheets

(56) References Cited

U.S. PATENT DOCUMENTS

| | | | | |
|---|---|---|---|---|
| 2013/0125406 A1* | 5/2013 | Delort | G02C 13/003 |
| | | | 33/200 |
| 2015/0119140 A1* | 4/2015 | Ikeda | A63F 13/5372 |
| | | | 463/31 |
| 2015/0178973 A1* | 6/2015 | Welch | G06T 1/00 |
| | | | 345/473 |
| 2015/0288944 A1* | 10/2015 | Nistico | H04N 13/0022 |
| | | | 345/156 |
| 2016/0086378 A1* | 3/2016 | Shuster | G06F 3/011 |
| | | | 345/633 |
| 2016/0300390 A1* | 10/2016 | Malafeew | A63F 13/245 |
| 2016/0300391 A1* | 10/2016 | Whittinghill | A63F 13/803 |
| 2017/0227771 A1* | 8/2017 | Sverdrup | G02B 27/0172 |
| 2017/0228938 A1* | 8/2017 | Fateh | G06T 19/006 |
| 2017/0278306 A1* | 9/2017 | Rico | G06T 19/006 |

OTHER PUBLICATIONS

Pupil Dilation and Eye-tracking, Joseph Tao-yi Wang, Oct. 20, 2009. Department of Economics, National Taiwan University, 21 Hsu-Chow Road, Taipei 100, Taiwan.*

* cited by examiner

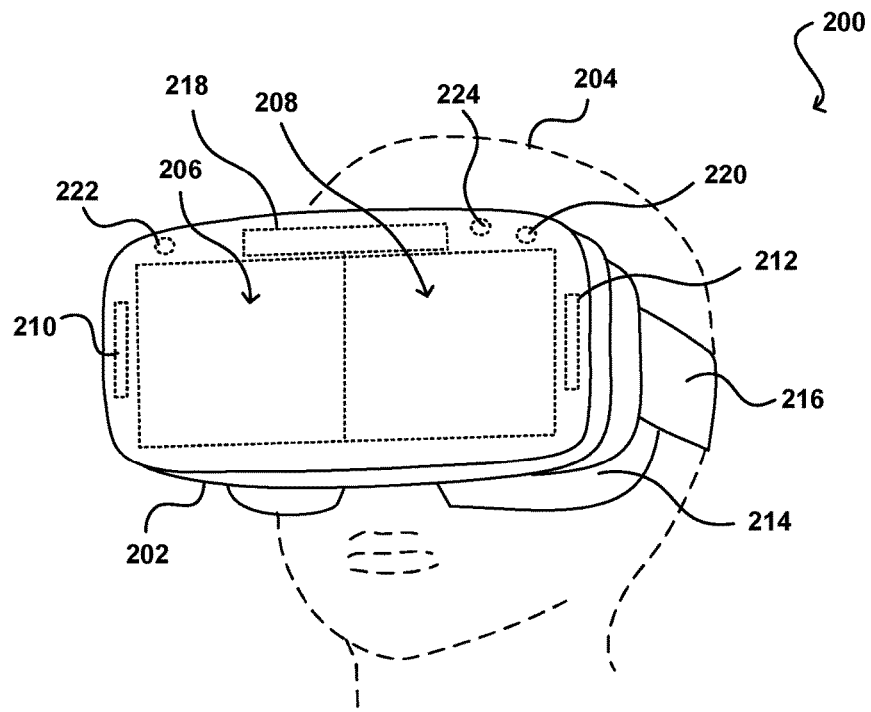
FIG. 2
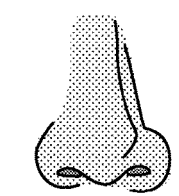 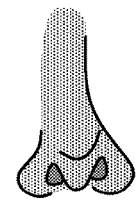 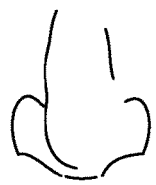
FIG. 3A  FIG. 3B  FIG. 3C

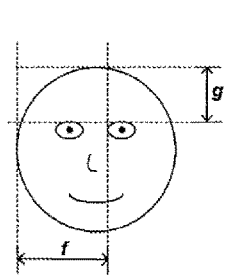
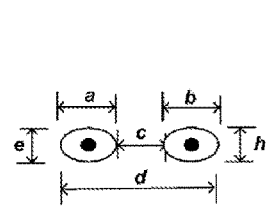
FIG 7A      FIG 7B
   
FIG 8A      FIG 8B      FIG 8C
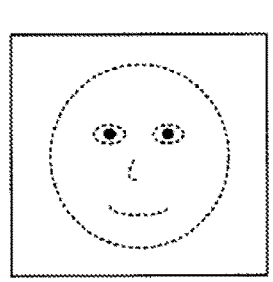 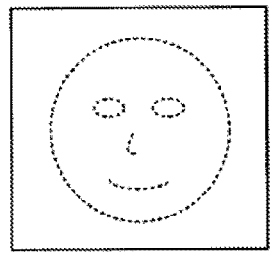 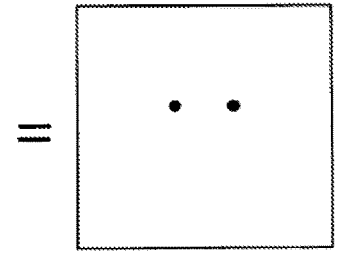
FIG 9A      FIG. 9B      FIG 9C

REALISTIC RENDERING FOR VIRTUAL REALITY APPLICATIONS

BACKGROUND

Virtual reality devices, such as headsets or goggles, are rapidly developing to the point where these devices should soon be widely available for various consumer applications. For example, virtual reality headsets that display images of a virtual world have been demonstrated at various events and application developers are preparing for their upcoming release. One issue that persists, however, is the problem of motion sickness. The human brain processes information in a certain way that, when the perceived reality is distorted or presented in an unexpected way, can lead to issues with motion sickness, headaches, and other such problems.

BRIEF DESCRIPTION OF THE DRAWINGS

Various embodiments in accordance with the present disclosure will be described with reference to the drawings, in which:

FIG. 2 illustrates an example virtual reality device that can be utilized in accordance with various embodiments.

FIGS. 3A, 3B, and 3C illustrate example nose shapes, sizes, and colors that can be determined and/or rendered in accordance with various embodiments.

FIGS. 7A and 7B illustrate an example analysis of facial features of a user in accordance with various embodiments.

FIGS. 8A, 8B, and 8C illustrate an example of capturing eye movement of a user as input in accordance with various embodiments.

FIGS. 9A, 9B, and 9C illustrate an approach to determining retina location from a pair of images that can be used in accordance with various embodiments.

DETAILED DESCRIPTION

Figure 1A:
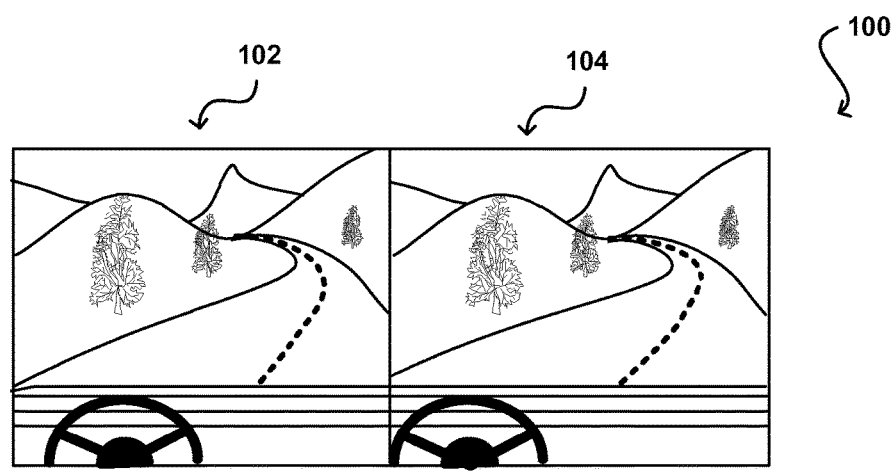
FIGS. 1A and 1B illustrate example left and right images that can be presented to a user wearing a virtual reality device in accordance with various embodiments.

Systems and methods in accordance with various embodiments of the present disclosure overcome one or more of the above-referenced and other deficiencies in conventional approaches to rendering virtual reality content in an electronic environment. In particular, various embodiments provide for the generation of a nose model for a user that can be used to render an appropriate nose portion in content displayed by a virtual reality device, such as a virtual reality headset. In some embodiments, a user can have the ability to "design" an appropriate nose for the user by selecting various options, such as an appropriate shape and color. In other embodiments the appropriate nose data can be determined dynamically by analyzing image data, including a representation of the face of the user, to determine the relative locations of various facial features or feature points. From these feature points the size, shape, and location of the user's nose can be determined. The size and shape data can be used to generate a virtual model (i.e., a wire frame model or mesh) of the user's nose. The location of the nose in the image data enables appearance data to be determined for the nose, where the appearance data can include data for aspects such as the base color, variations in color, texture, and reflectivity of the nose, which can be used when applying texture, lighting, and/or shadowing to the nose model.

When a virtual reality (VR) device is to display VR content to the user, the content to be rendered can be obtained, as well as the relevant nose data including the mesh and texture data. Since views are rendered for each eye, a point of view can be determined for each eye display and the appropriate portion of the nose rendered from that point of view. The nose can be treated as an object in the virtual environment and can have lighting, shading, and other effects applied just like any other object in the virtual world. As the user moves his or her head, or changes gaze direction, the changes in view can be rendered accordingly. The level of detail (e.g., resolution and texture) applied to the nose can depend at least in part upon factors such as lighting and gaze direction. If the user changes expression, the nose can be re-rendered to have a slightly different shape that represents the current user expression. The presence of a substantially accurate nose portion visible in the field(s) of view of the virtual reality device can help to mitigate motion sickness resulting from using the device. Using the image data analyzed for nose shape and size, for example, the pupillary distance (i.e., physical separation between points such as the centers of the user's pupils) of the user can be determined. In some embodiments the pupil positions can be determined as two of the feature points generated from the feature detection process. The pupillary distance for a user enables virtual content to be rendered from the correct points of view (i.e., with the correct amount of disparity), which can further help to mitigate motion sickness in at least some embodiments.

Various other functions and advantages are described and suggested below as may be provided in accordance with the various embodiments.

FIG. 1A illustrates an example pair of images 102, 104 that can be displayed to a user wearing a virtual reality headset, or other such device, in accordance with various embodiments. As known for such devices, a different view is typically rendered and/or displayed for each of the user's eyes, with each view being slightly different due to the difference in locations of the user's eyes. The pupillary distance (or other measure of physical separation or relative locations of the user's eyes) between the user's eyes causes objects to be viewed from slightly different angles, with the difference in angle depending at least in part upon the distance from the object to the user's eyes. This varying angle with distance, which results in a different apparent lateral separation between representations of objects in the left and right images, is typically referred to as disparity. Objects at "infinity" will have representations appear at approximately the same pixel location in each image because the difference in angle will be approximately zero degrees. As objects get closer, the angular difference between the locations of the object with respect to each eye will increase, such that the difference in pixel location(s) of the object representation will increase between the two images. For example, an object close to the user's eyes will appear to be significantly further to the left (e.g., 100 pixels further to the left of center) in the right eye image than the representation of that object in the left eye image. Thus, in FIG. 1A the portion of the road closer to the user has a greater difference in pixel location than the portions of the road that are further away, based on the difference in disparity with distance.

When rendering a virtual reality scene, this difference in angle with disparity can be used to render the same scene from two different points of view. In the driving example, there will be a virtual model (i.e., a wire frame or mesh model) of the road and surrounding environment, and the relative "position" of each eye in the scene can be used as a point of reference from which to render the scene for each of the left eye image and the right eye image, which will result in the appropriate amount of disparity between views. For each image, the view of the virtual three-dimensional (3D) model can be determined, then the appropriate textures and lighting applied (as known for such purposes) to render the scene from the two different viewpoints. The left and right eye images can be displayed concurrently, using two separate display screens or portions of a single display screen, or in alternating sequence, with a virtual shutter or other such element causing the left and right eyes to alternatively be able to view the content when the corresponding image is displayed. Such a process provides the 3D appearance of the environment. A virtual reality device typically also includes some type of motion and/or orientation detection sensor, such as an accelerometer, gyroscope, electronic compass, inertial sensor, magnetometer, and the like, which can provide data as to movement of the virtual reality device resulting from movement of the user's head, in general. The point of view and direction can thus be updated with movement of the device such that the views presented to the user correspond to the expected view based on the user movement. The views can be re-rendered and displayed at an appropriate rate, such as thirty or sixty frames per second, such that the user can feel as if the user is actually in the virtual environment based on the combination of the appropriate rendering with changes in user head orientation, etc.

As mentioned, however, slight variations or deviations from expected reality can present problems such as motion sickness. These deviations can include, for example, dropped frames, delays in point of view updates, improper lighting or shading, and other such aspects. One approach that has been demonstrated to potentially mitigate motion sickness is the introduction of a virtual nose displayed in the virtual reality views. The human brain is used to detecting the user's nose in information captured by each eye, then filtering out that portion of the information such that the human typically will not notice the nose portion in the field of view. The lack of such a nose can signal to the brain that there is something wrong with the reality being presented, which can lead to motion sickness. The discussion of virtual noses included in virtual reality to this point has not presented sufficient information as to how to determine the correct appearance of the nose in the virtual reality environment. Further, the discussion has not touched on how the virtual environment interacts with virtual noses, or how the nose appearance should change under various environmental conditions.

Approaches in accordance with various embodiments attempt to address these and other deficiencies with existing virtual reality devices and applications by determining an appropriate nose appearance for a user, and rendering that nose in an expected way for the user. Further, the rendering can be updated to appear to correctly interact with the environment, including not only changes in brightness, color, and appearance, but also changes in shape with expression, changes in focus or resolution, and the like. Approaches can also use a feedback control loop such that if a user is detected to be looking at the rendering of the nose in the virtual reality device the rendering of the nose can change since the current rendering is not optimal or expected for the current conditions.

Figure 1B:
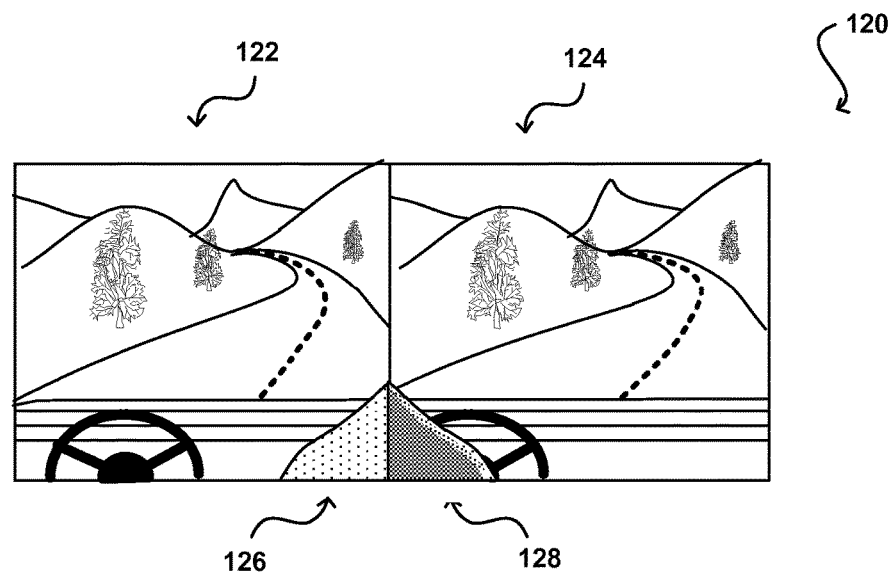

For example in the example left and right images 102, 104 rendered in FIG. 1B there is a left rendering 126 and a right rendering 128 of portions of the user's nose. As would be expected, the left image 122 includes a rendering 126 showing the left side of the user's nose in the lower right hand corner of the image, illuminated due to the location of the virtual sun being to the left of the nose in the images. Correspondingly, the right image 124 includes a rendering 128 of the right side of the user's nose that is somewhat shadowed, due to the location of the virtual sun. These renderings can be determined to be appropriate for the user based on information known about the user's nose, the user's current expression, and/or other such information. As the virtual vehicle goes along the virtual road, and as the user looks around in the virtual world, the relative location of the sun with respect to the nose will change, such that the lighting and/or shading should change appropriately. Further, aspects such as the resolution and/or focus of the renderings may change based upon aspects such as the lighting, viewing direction of the user, etc. Various embodiments attempt to determine some or all of these variations and update the rendering of the nose in a way that is expected, or at least relatively normally perceived, by the user.

FIG. 2 illustrates an example virtual reality device 200 that can be utilized in accordance with various embodiments. Various other types of devices, such as smart glasses, goggles, and other virtual reality displays and devices can be used as well within the scope of the various embodiments. In this example, the device includes a housing 202 made of a material such as plastic with a polymer lip 214 or other such portion intended to contact the user's face in order to provide for comfort of the user as well as providing a relatively light-tight seal to prevent extraneous light from passing to the user's eyes while wearing the device. The example device also includes a strap 216 or other such mechanism for securing the device to the user's head, particularly while the user's head 204 is in motion. The example device includes a left eye display screen 208 and a right eye display screen, although as mentioned in some embodiments these can be portions of a single display screen or arrays of multiple screens, or holographic displays, among other such options. In some embodiments a single display element will be used with respective convex lenses for each eye and one or more separation elements that limit the field of view of each eye to a designated portion of the display. The device will typically include display circuitry 218, as may include memory, one or more processors and/or graphics processors, display drivers, and other such components known or used for generating a display of content. There can be a single set of circuitry for both displays 206, 208 or at least some of the components can be duplicated for each display such that those components only provide for display of content on one screen or the other. The display screens can be any appropriate type of display, such as an AMOLED or LED display with sufficient refresh rate for virtual reality applications. The device includes one or more motion and/or orientation sensors 210, as may include at least one accelerometer, magnetometer, gyroscope, electronic compass, inertial sensor, and/or other such sensor for providing data about rotation, translation, and/or other movement of the device. The motion and/or orientation data can be used to determine the appropriate point of view (POV) from which to render the current scene of content. The example device also includes at least one communication component 212, such as a wired or wireless component for transmitting data over a protocol such as Bluetooth, Wi-Fi, 4G, and the like. The communication component can enable the device 200 to communicate with a computing device for purposes such as obtaining content for rendering, obtaining additional input, and the like. The example device can include other components as well, such as battery or power components, speakers or headsets, microphones, etc.

The example device 200 can also include one or more cameras 220, 222 or other image capture devices for capturing image data, including data for light reflected in the ambient or infrared spectrums, for example. One or more cameras can be included on an exterior of the device to help with motion tracking and determining environmental conditions. For example, locations of light sources, intensity of surrounding ambient light, objects or persons nearby, or any of various other objects or conditions can be determined that can be incorporated into the virtual reality scene, such as to make the lighting environmentally appropriate or to include things located around the user, among other such options. As mentioned, tracking the motion of objects represented in the captured image data can help with motion tracking as well, as rotation and translation data of surrounding objects can give an indication of the movement of the device itself.

Further, the inclusion of one or more cameras 220, 222 on the inside of the device can help to determine information such as the expression or gaze direction of the user. In this example, the device can include at least one IR emitter 224, such as an IR LED, that is capable of emitting IR radiation inside the device that can be reflected by the user. IR can be selected because it is not visible to the user, and thus will not be a distraction, and also does not pose any health risks to the user. The IR emitter 224 can emit radiation that can be reflected by the user's face and detected by one or more IR detectors or other image capture elements 220, 222. In some embodiments the captured image data can be analyzed to determine the expression of the user, as may be determinable by variations in the relative locations of facial features of the user represented in the captured image data. In some embodiments, the location of the user's pupils can be determined (as discussed elsewhere herein), which can enable a determination of the gaze direction of the user. The gaze direction of the user can, in some embodiments, affect how objects near to, or away from, the center of the user's field of view are rendered.

As mentioned, the nose to be rendered in the virtual reality environment can be selected, generated, or otherwise determined so as to be appropriate for the particular user. FIGS. 3A, 3B, and 3C illustrate example nose renderings 300 that can be utilized in accordance with various embodiments. As illustrated, the noses appropriate for different users can have many different characteristics, including different overall sizes and shapes, as well as different sizes and shapes of specific portions such as the bridge, tip, and nostrils. The size, shape, and location of the nostril bump can be important as to how the nose is perceived in various circumstances. Other factors can vary by user as well, such as reflectivity (based on oil levels of the skin), texture, etc. In some embodiments a user can be presented with various options and tasked with selecting a virtual nose that most closely matches the user's nose. This can include, for example, being presented with a set of nose shapes such as illustrated in FIGS. 3A-3C, whereby the user can select one of the noses as being most appropriate. In some embodiments the user may have the ability to modify the shape of the selected nose, such as to adjust a size or shape of a portion of the nose, which can affect the underlying nose model used for rendering. The user can also have the option of selecting a color for the nose, such as by selecting one of a set of colors or using a slider bar to select an appropriate color from a palette, among other such options. The nose shape and size data can be stored as nose model data and the color stored as texture data (or other such data) for the user for use in rendering virtual content with a device such as that described with respect to FIG. 2.

In other embodiments, the nose data for the user can be determined using image data captured for the user. For example, a user can capture an image of the user's face, often referred to as a "selfie," that includes a view of at least a significant portion of the user's face. A video stream, burst of images, or set of video frames can also be captured in accordance with various embodiments. Stereoscopic image data or image data captured from different viewpoints can give more accurate data as to shape, or at least data that is accurate in three dimensions. A facial recognition algorithm or process can be used to analyze the image (or image data) to determine the relative locations of various facial features of the user in the image. An example of one such set of feature points is displayed in the situation 400 of FIG. 4A. In this example, specific facial feature points 402 are determined. The relative spacing of these points 402 helps to determine information such as facial structure, expressions, and the like. As illustrated, a set of these feature points will also correspond to the user's nose. Using these points, the general size (at least with respect to the user's head or face) and shape of the user's nose can be determined. These points and/or the determined size and shape can be used to generate the nose model (i.e., a 3D wire model for object rendering) for the user. In some embodiments the symmetry of the nose can be taken into account so as to only have to store data for one side of the user's nose, as may include data for the uttermost right, left, bottom, and top of one side of the nose, along with a center point or other such data. In other embodiments data for a full model can be stored to account for any asymmetries in the user's nose. Since the points identify the location of the nose in the image, the portion of the image corresponding to the nose can also be analyzed to determine the appearance of the nose, as may include factors such as color, skin texture, and reflectivity. This data can be stored as texture data that can be mapped onto the nose model during the rendering process. In this way, the size, shape, and appearance of the user's nose can be determined with minimal effort on the part of the user. The image can be captured using the VR device, a separate computing device, or a digital camera, or an existing image can be uploaded or otherwise provided for analysis.

Figure 4A:
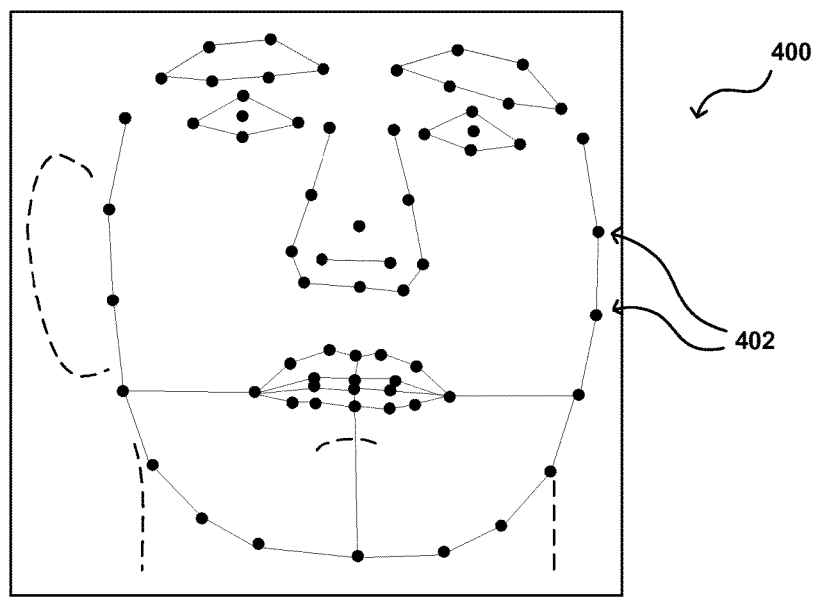
FIGS. 4A and 4B illustrate example facial feature points that can be detected and used for nose rendering in accordance with various embodiments.
Figure 4B:
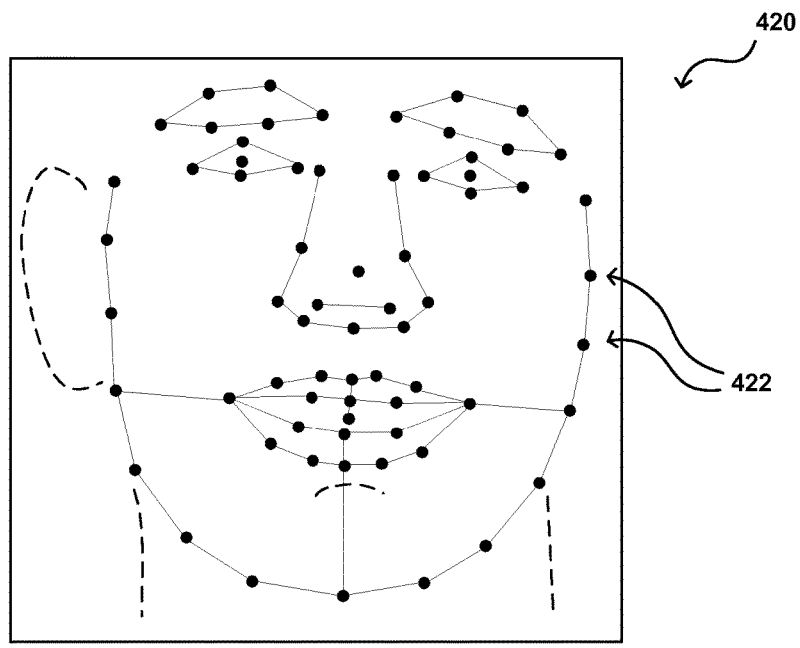

As mentioned, the shape of the user's nose can vary with expression. For example, the situation 420 of FIG. 4B illustrates the relative location of feature points 422 determined for a user from a second image (or video frame) where the user is smiling or laughing. It can be seen that, with respect to FIG. 4A, the relative positions of many of the facial feature points have changed. It can also be seen that the relative positions of the points corresponding to the user's nose have changed as well. Thus, it can be desirable in at least some embodiments to capture multiple images, video frames, or a stream of video data wherein the user exhibits multiple expressions. The user can be directed to make certain expressions at certain times, which can then be captured and analyzed with the relative positions associated with the specified expression. In other embodiments the user can be instructed to make various expressions, and the facial analysis algorithm can determine the appropriate expression based upon trained classifiers or other such approaches. A camera on the inside of the virtual reality device (or other such location) can then monitor the relative positions of visible facial features to attempt to determine the user's current expression, which can then cause the nose rendered for the VR environment to use a nose model relevant for that expression. In some embodiments a library of nose models can be maintained for a user, while in other embodiments a single model can be stored that includes information for various facial expressions, among other such options. For example, in some embodiments a basic nose model can be determined and then the model can be modified by expression using a set of standard expression modifiers or animations applicable to most users. In many instances the changes in nose shape may be subtle such that a general animation or modeling approach may be sufficient for at least some implementations.

Figure 5:
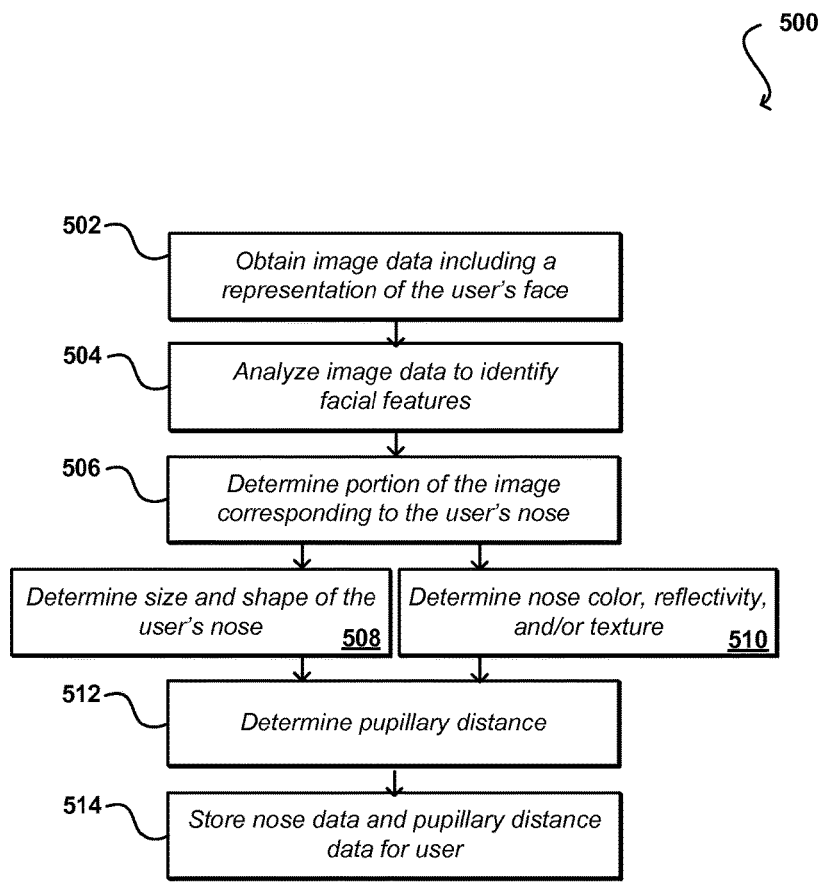
FIG. 5 illustrates an example process for determining nose model information for a user that can be utilized in accordance with various embodiments.

FIG. 5 illustrates an overview of an example process 500 for determining nose data for a user that can be used in accordance with various embodiments. It should be understood that there can be fewer, additional, or alternative steps performed in similar or alternative orders, or in parallel, within the scope of the various embodiments unless otherwise stated. In this example, image data including a representation of a user's face is obtained 502. As mentioned, this can include a user providing an image showing the user's face, or obtaining an image previously stored with a user profile or account. In other embodiments this can include instructing a user to capture an image and/or video (using a camera of a computing device, webcam, VR device, etc.) showing a view of the user's face, including the user's nose, from one or more points of view. In some embodiments the user can be instructed to pan a camera around the user's face while capturing video or other image data. The image data can be analyzed 504 to identify facial features, or feature points, present in the image. The algorithms used can include, for example, principal component analysis (PCA) algorithms, machine learning algorithms, Hidden Markov model analysis, linear discriminate analysis, and the like. These algorithms can be trained to recognize facial features of a user represented in an image and determine the relative positions of those features. Once a set of facial feature points is determined, the portion of the image corresponding to the user's nose can be determined 506. In at least some embodiments the output of the algorithm will not only be a set of coordinates for the facial feature points but also the specific feature point (i.e., tip of nose) that was identified. From the set of facial feature points a subset of points corresponding to the user's nose can be determined, and the region of the image bounded by these points can be considered to be the nose portion of the image in this example. Once the region of the image corresponding to the nose is determined, one or more aspects of the nose can be determined, such as to determine 508 the size and shape of the user's nose based at least in part upon the relative locations of the nose feature points and to determine 510 appearance characteristics such as the color/skin tone, reflectivity, and/or texture. This can include, for example, analyzing the pixel values for the pixels within the nose region using color analysis and skin texture analysis, among other such processes. In some embodiments a base skin tone for the nose can be determined, as may be represented by a specific location of the nose or an average of the color values of the pixels in the nose region, among other such options. In at least some embodiments a hue map or other such mapping can be generated that stores information about the deviation from the base nose color for each position (or polygon to be rendered) for the user's nose. In some embodiments at least one image can be taken with a flash or other illumination that can also provide some indication of the reflectivity of the nose, as the color and illumination of certain areas can be compared with and without illumination using a reflectivity determination algorithm or other such process. As mentioned, other information can be calculated from the identified facial features as well. For example, features corresponding to the user's eyes can be used to determine 512 the pupillary distance for the user, which can be used to generate virtual reality visuals that have accurate points of view customized for the individual user. The nose model, color, texture, pupillary distance, and other such data can then be stored 514 as nose data for the user that can be used to render a portion of a nose using a virtual reality device or other such system. The nose data can be stored to memory in a virtual reality device, but in many applications will instead be stored in a computing device associated with the user or a remote system or service that can provide the information to the virtual reality device, where the remote system or service can store the information as associated with a particular user or user account, among other such options.

Figure 6:
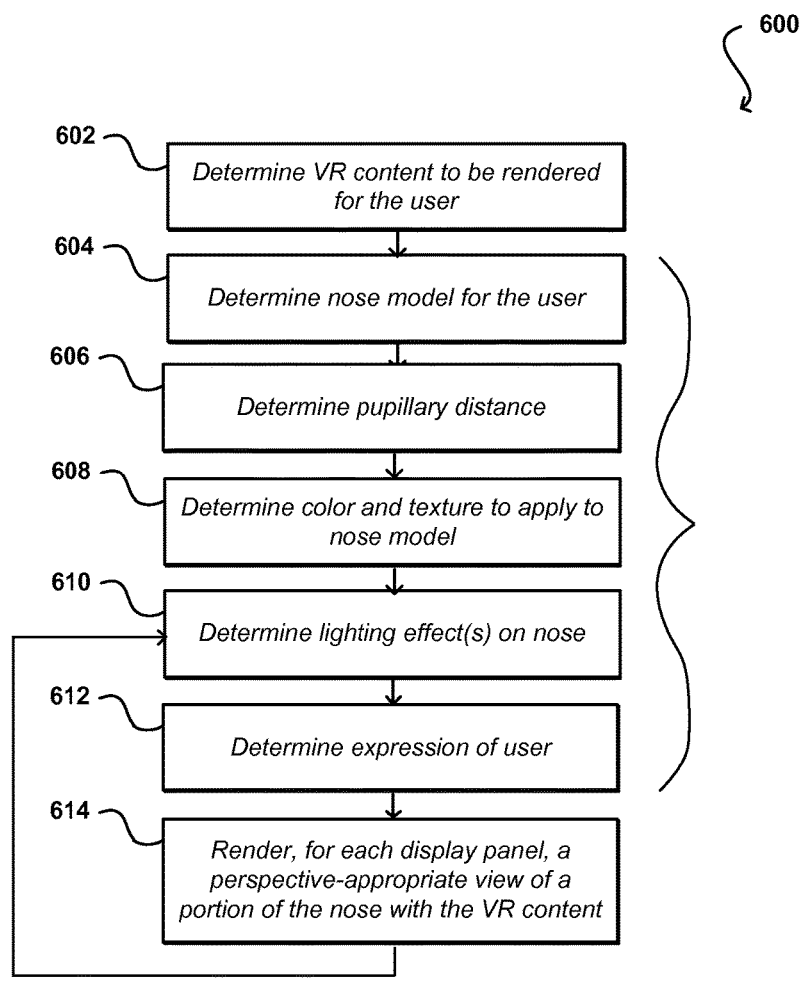
FIG. 6 illustrates an example process fir using nose model information for a user to render a portion of a nose in a view of content for a virtual reality device that can be utilized in accordance with various embodiments.

FIG. 6 illustrates an example process 600 for rendering a user nose in a virtual reality environment that can be utilized in accordance with various embodiments. In this example, virtual reality content to be rendered for the user can be determined 602. The content can include content about the relevant virtual reality environment, as well as information about any objects to be displayed in that environment. The content can be determined based at least in part upon a game or application selected for execution, and the content can be obtained from any appropriate source, such as a computing device in direct communication with a virtual reality device or a remote system, server, or service configured to provide the content to the virtual reality device. In addition to the virtual reality content, nose data useful for rendering a user nose in the virtual reality environment can also be obtained. This can include, for example, determining the user for whom the nose is to be rendered. This can be determined by way of user login or configuration, or by performing facial recognition using at least one camera or biometric sensor on the device, among other such options. The relevant nose model for the user can be determined 604, such as by obtaining the nose model information generated using a process such as that described with respect to FIG. 5 and associated with the relevant user account. In some embodiments a camera in the virtual reality device can capture image data that can be used to determine the nose model in near real time, without a prior determination. The pupillary distance for the user can be determined 606 using a process similar to the process for obtaining the nose model for the user as discussed elsewhere herein.

Other user data useful rendering virtual reality visuals can be determined as well, such as by determining 608 data for shading the nose model, where that data can include information about the skin tone, texture, and/or reflectivity of the nose, among other such options. This information also can be obtained as discussed with respect to FIG. 5 or obtained in near real-time using at least one camera of the VR device, among other such options. Other information useful in determining the appropriate rendering of the nose can be determined as well. For example, the lighting effect(s) to apply to the nose can be determined 610. This can include determining the relative direction of light sources (e.g., point, uni-directional, or omni-directional light sources) in the virtual environment, determining the brightness and color of those light sources, etc. In some embodiments the current expression of the user can also be determined 612, such as by capturing image data of the user using at least one camera of the VR device and performing a facial recognition process to determine the relative location of various facial features. These features then can be run through a trained classifier or other such process or algorithm to determine the expression, which can determine the appropriate version or state of the user nose model to use for rendering. Although these steps are described sequentially, it should be understood that steps such as any of 604, 606, 608, 610, and/or 612 can be performed concurrently or in different orders in at least some embodiments. For each virtual reality panel (i.e., left and right eye displays) a perspective-appropriate view of the portion of the user's nose can be rendered 614 with the VR content, with the perspective-appropriate views being rendered using the pupillary distance for determining the appropriate viewpoints for each panel. As discussed, this can include determining the appropriate portion of the nose to display based on the user's field of view, point of view, and the user nose model. The appropriate color (or skin tone) and texture can be mapped onto the nose model, and the lighting and reflectivity information used to light or shade the nose portion. As discussed, the left and right views of the nose can be rendered separately, as the effect of the lighting will be different for each point of view in most circumstances. As mentioned, aspects such as the brightness and state of the environment can also affect aspects such as the resolution and focus of the nose rendering, among other such options. For example, a relatively low texture virtual nose can be rendered with nothing but the skin tone as color in a relatively dark environment, while a more detailed high texture virtual nose with a complete tone map or texture mapping can be performed in bright environments or other such situations. If the lighting is bright from one side, the bright side of the nose might be rendered in high resolution while the dark side is rendered with low resolution. In many instances the nose should be treated as an object in the scene, such that the lighting, shading, and reflection effects should be applied to the nose as would be applied to any other object in the scene, based at least in part upon position in the scene, portion visible for each point of view, etc. Also, the rendering can be updated or new renderings generated as the user moves his or her head, the lighting changes, the user changes expression, or other changes occur as discussed and suggested elsewhere herein.

In addition to obtaining nose data, the image data of the user can be used to determine pupillary distance as well. The pupillary distance, or the distance between the two eyes of a user, is important for at least some virtual reality experiences, as the pupillary distance determines the appropriate point of view and disparity to render in the VR images. Conventional systems utilize a fixed pupillary distance for all users as an approximation, but large differences in pupillary distance can result in views that are not quite accurate, which can potentially account for some level of motion sickness. By determining the appropriate pupillary distance, and using that distance to determine the points of view from which to render the right and left images, a more accurate experience can be generated that more accurately reflects what the user's brain would expect. The process used (and discussed above) to determine the facial features and aspects such as nose size and shape can also be used to determine pupillary distance. For example, the example of FIG. 4A shows points at the center of each pupil, and the distance between these points can be used as a measure of the pupillary distance. The pupillary distance can also be used to generate customized glasses or goggles, for example, which can be optimized for the pupillary distance with respect to lens separation, orientation, and other such aspects. The relative measure of the distance with respect to other features on the user's face can provide an approximate distance even if an accurate scale of the image cannot be otherwise obtained. The distance between the center of the nose and the eyes can also be important, and can rely at least in part upon accurate eye location data. The distance can determine the relative expected size of the nose from the person's point of view, such that the measure of distance from the eyes to the tip of the nose can provide another level of improvement in accuracy over conventional approaches.

As mentioned, there can be one or more cameras placed on the VR device itself in order to capture specific types of data about the user, whether facial data used to determine the appropriate nose data or expression and motion data for use in rendering an appropriate nose at different times. Accordingly, there can be one or more front-facing cameras for determining aspects of the environment, as well as for imaging the user as the user picks up and/or puts on the device, which as mentioned previously can capture images useful for modeling the user nose. The cameras can also be positioned at an inner region of the device in order to capture IR reflected from the pupils in order to perform gaze tracking or other such actions. One or more cameras can also be positioned at the sides or other locations for capturing data about the user's face while in the VR environment, such as expressions, amount of sweat, etc. These cameras, likely IR-based in order to minimally distract the user, can be positioned to capture the user's face from the front, sides, top, bottom, or other appropriate location(s) or direction(s).

As mentioned, the rendering of content (including the resolution and/or texture used to render the virtual nose) can depend in at least some embodiments upon the gaze direction (or gaze position, viewing location, etc.) of the user with respect to the VR content and/or the display(s) of the VR device displaying the content. In some embodiments, at least one camera (or other image capture element) of a computing device is used to image at least a portion of a user. The image capture element can utilize ambient light surrounding the device or user, or can rely upon light emitted from a display element, light emitting diode (LED), or other component of the electronic device. In other embodiments, at least one image capture element is used that captures infrared (IR) or other radiation emitted from a component (e.g., an emitter such as an IR light emitting diode (LED) or laser diode) of the computing device, and reflected by the user. In some embodiments, both an ambient light camera and one or more infrared detectors are used to determine aspects of relative position and/or movement.

Certain approaches can utilize image recognition to track aspects of a user for use in providing input to the device. Accordingly, several embodiments described and suggested herein infrared (IR) radiation, or other ranges of radiation that are outside the range of viewable light that is detectable by a human user. In addition to being imperceptible by a user, such that the user experience is not degraded if the user is illuminated with such radiation, IR can provide a relatively inexpensive tracking mechanism by taking advantage of the properties of the human eyes to obtain at least one point source. For example, the human retina is a retro-reflector, such that light is reflected back at substantially the same angle in which the light was incident on the retina. Thus, light from one angle will not be reflected back from the retina along another (substantially different) angle. Further, the human eye absorbs certain wavelengths, such that light of one wavelength may be reflected by the retina while light of another wavelength may be absorbed by the cornea and/or other portions of the eye, or otherwise not reflected back.

These properties enable two images to be captured that can be low-color or grayscale in nature, as the portions of interest will either show reflection, or show little to no reflection, at the position of the pupils, for example. If one image is captured that includes the reflected light from the retinas, and another image is captured that does not include the reflected light, the images can be compared to quickly determine the relative location and dimensions of the user's pupils (or other such features). Since other features of the user will generally reflect the same for each image, an image comparison can readily reveal the relative position of the pupils without a significant amount of image processing.

In various embodiments, a running difference can be performed between images including (and not including) the light reflected from the retinas. Subtracting the absolute values of the pairs of images will leave substantially two disc-shaped features corresponding to the relative positions of the user's pupils (as well as those of anyone else in the view) such that changes in position or direction can quickly be determined and monitored over time. There can be features in the subtracted image pairs that result from movement or other occurrences, but these features typically will not be disc shaped and can readily be removed from consideration.

As mentioned, a computing device can include at least one image capture element for capturing image information about the user of the device. The imaging element may include, for example, a camera, a charge-coupled device (CCD), a motion detection sensor, or a radiation sensor, among many other possibilities. An example device includes at least one IR emitter and at least one IR detector. In other embodiments, as discussed herein, a device could instead include two ambient light cameras in place of the two detectors and can utilize ambient light and/or light from the display element. The IR emitter can be configured to emit IR radiation, and each IR detector can detect the IR radiation reflected from a user (or other such surface or object). If there are multiple IR detectors, offsetting the detectors can cause each detector to detect radiation reflected at different angles.

In one example, a first IR detector can be positioned substantially adjacent to the IR emitter such that the first IR detector will capture infrared radiation reflected back from a surface, such as a viewer's retinas, in a direction that is substantially orthogonal to the capture plane of the detector. A second IR detector positioned a distance away from the IR emitter will only, detect IR radiation reflected at an angle with respect to the orthogonal direction. When imaging a retro-reflector such as a user's retina, the second IR emitter will detect little to no reflected radiation due to the IR emitter, as the retina will not significantly reflect in the direction of the second emitter (although defects, particulates, or variations may deflect some of the radiation). As discussed later herein, this difference among images can be used to determine the position (and other aspects) of the retinas of a user, as the difference in IR reflection between the two images will be significant near the pupils or other such features, but the remainder of the images will be substantially similar.

In an alternative embodiment, a computing device utilizes a pair of IR emitters (e.g., IR light emitting diodes (LEDs), IR laser diodes, or other such components), to illuminate a user's face in a way that is not distracting (or even detectable) to the user, with the reflected light being captured by a single IR sensor. The LEDs are separated a sufficient distance such that the sensor will detect reflected radiation from a pupil when that radiation is emitted from the LED near the sensor, and will not detect reflected radiation from the pupil when that radiation is emitted from the LED positioned away from the sensor. The sensor can capture IR images that enable the device to analyze features of the user that reflect IR light, such as the pupils or teeth of a user. An algorithm can attempt to calculate a position in three-dimensional space (x, y, z) that corresponds to a location equidistant between the user's eyes, for example, and can use this position to track user movement and/or determine head motions. A similar approach can be used that utilizes a single IR emitting diode and a pair of IR sensors, as discussed above. Thus, the device can either direct IR from two locations or detect IR from two locations, with only one of those locations receiving retro-reflected radiation from a user's retinas. Other embodiments can utilize other approaches for performing head tracking, such as by requiring a user to wear glasses that emit IR radiation from a point source, etc.

In some embodiments it can be preferable to utilize a single emitter and two cameras when using single wavelength IR (e.g., 940 nm) in two directions, as using a single camera might be cheaper but also requires that images from the different directions be captured at different times. A downside to capturing images at different times is that movement during that period can affect the determination, even for capture frequencies on the order of 30 Hz (or 15 Hz for two cameras to get the same resolution). An advantage to a multi-camera system is that the images can be captured substantially simultaneously, such that movement between images is minimized. A potential downside to such an approach, however, is that there can be optical variations in the images due to the images being captured from two different points of view.

In one embodiment, a single detector can be used to detect radiation reflected at two different wavelengths. For example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Alternatively, a single LED can be used that is able to emit (by itself or through use of optics or filters) radiation at both wavelengths, concurrently or otherwise. Specific wavelengths can be selected within selected wavelength ranges, based at least in part upon their reflective properties with respect to the human eye. For example, experiments indicate that light has less than a 50% absorption rate (fir the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation concurrently, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

The emitter(s) and detector(s), and any ambient light camera(s) or other image capture element(s), can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the users gaze.

In some embodiments, it might be useful for a user to participate in a calibration process which accounts for aspects such as the strength of eye reflection from the user, as well as to determine dimensions, calibrate gaze direction determinations, etc. Such an approach also can be useful if a user uses glasses that reduce the reflective capability, etc.

In order to determine the gaze position of a user in at least some embodiments, one or more images are captured using one or more cameras or image capture elements as discussed herein. Once images of the user's face are obtained, one or more algorithms can analyze the images to attempt to determine information about the images, such as the location of specific features in each image. As discussed above, certain embodiments utilize information about the user's eyes to attempt to determine information such as relative movement between the computing device and the user, as well as changes in gaze direction of the user. As discussed, a imaging element of a computing device can capture an image of at least a portion of a user of the device when the user is in front of the device (or at least within the viewing angle of an imaging element of the device), such as would normally occur when the user is viewing the display element of the device.

The computing device can store, or otherwise have access to, at least one algorithm to analyze the captured images, as may be stored at least temporarily on the device itself, or can send the images to be analyzed by a remote computer or service, etc. Any of a number of algorithms can be, used to analyze images, detect features, and track variations in the positions of those detected features in subsequent images. For example, FIG. 7A illustrates an image of a face 700 of a user of a device as could be captured (e.g., obtained or imaged) by an imaging element of the device. Thus, the face 700 is depicted as perceived by the imaging element of the device. As can be seen in FIG. 7A and also in the eye-specific view of FIG. 7B, there are various aspects of the user's face that can be located and measured, such as the perceived width and height of a user's eyes, the perceived relative separation of a user's eyes and the perceived relative position of the user's eyes to an edge of the user's face when facing the device. Any number of other such measurements or aspects can be used as should be apparent. When a user tilts or translates the device, or moves his or her head in any direction, there will be a corresponding change in at least one of these measured aspects in subsequent images that are obtained. For example, if the user tilts his or her head right or left, the horizontal distance f in FIG. 7A between the user's eyes and an edge of a side of the user's face will change. In a similar manner, if the user tilts his or her head up or down, the vertical distance g between the user's eyes and an edge of the top of their head will change. Further, the shape or horizontal measurements a and b and the shape or vertical measurements e and h of the user's eyes will change and can change by different amounts. The separation distance c between the eyes can change as well. Using such information, the device can determine a type of motion that occurred and can use this information to help interpret the movement of the user's pupils or other such information.

For example, FIGS. 8A, 8B, and 8C illustrate movements 800 of a user's pupils with respect to the user's eye position that can be determined in accordance with various embodiments. In some embodiments, the user's pupil position relative to the user's eye position can be at least partially indicative of the gaze direction of the user. For example, assuming the user is facing toward the device, in FIG. 8A the user is gazing forward, while in FIG. 8B the user is gazing downward and in FIG. 8C the user is gazing to the left (in the figure). Such information by itself, however, may not be sufficient to determine gaze direction. For example, if the user had tilted his or her head up (or back) while making the pupil movement in FIG. 6B, the user might actually be looking forward (or even 'up' relative to the previous position). Further, if the user translates his or her head to the left or right in FIG. 8A, but does not adjust the position of the pupils with respect to the user's eyes, then the gaze position would actually change even though the user is still looking straight ahead. Thus, in certain embodiments, it can be advantageous to utilize facial measurement approaches to interpret the pupil movements of FIGS. 8A through 8C.

In some embodiments, the accuracy of the image capture and detection can be such that gaze direction and/or field of view can be determined based substantially on pupil-related information. In one embodiment, image analysis can be performed to locate the position of the user's pupils. The dimensions of the pupils themselves, as well as position and separation, can be indicative of changes in the user's gazing direction. For example, in addition to determining that pupils move from left to right in adjacently-captured images, the device can determine, due to small changes in the width of each pupil, whether the user position with respect to the device has translated. Similarly, the device can determine whether the user rotated his or her eyes, which would result in changes in diameter since the eyes are spherical and changes in rotation will result in changes in the captured dimensions. By being able to precisely measure pupil-related dimensions, the device can track the field of view of the user with respect to the device.

Another benefit to being able to accurately measure pupil-related dimensions is that the device can also determine a focus depth of the user. For example, if the user focuses on a point "farther away" from the user, the device can detect a change in separation of the pupils. Because the device can also measure the dimensions of the pupils in the image, the device can also determine that the increase was not due to an action such as a decrease in the distance between the user and the device. Such information can be useful for three-dimensional images, for example, as the device can determine not only a gaze position, but also a depth at which the user is focusing in order to determine where the user is looking in three-dimensional space.

While user information such as pupil measurements can be determined through various image analysis approaches discussed above, conventional image analysis algorithms are relatively processor-intensive and can require a significant amount of memory. Conventional portable devices, such as cellular phones and portable media players, might not have the necessary resources to perform such real-time image analysis, particularly at the resolution needed to detect small variations in pupil diameter. Further, in order for the image capture to work there must be a sufficient amount of ambient light, such that if a user is reading an electronic book on a device with a display such as an electronic paper display that does not generate significant illumination as would an LCD or similar display element, there might not be enough light to adequately capture the necessary image information.

FIGS. 9A through 9C illustrate an example process for determining pupil or retina parameters using infrared radiation that can be used in accordance with various embodiments. In this example, a first image is shown in FIG. 9A that was captured using a sensor positioned near an infrared source, such that each retina substantially reflects the infrared radiation back towards the sensor. FIG. 9B illustrates another image captured using a sensor positioned away from an infrared source, such that any IR radiation reflected by the retinas is not directed towards, or detected by, the sensor. Thus, as can be seen, the major significant difference between the two images is the reflection by the retinas. Using simple image comparison or subtraction algorithms, for example, the retinas can quickly be extracted from the images once the images are aligned using a process such as those discussed above. If noise is sufficiently filtered out, using any appropriate method known in the art, the resultant image in FIG. 9C will include substantially only the reflection from the retinas, which can quickly be analyzed with very little resource allocation.

As mentioned, in some embodiments there may be some inaccuracy due to the fact that the images being compared are not captured simultaneously. For example, in some embodiments a single detector is used to capture images using light of different wavelengths, IR radiation reflected from different IR emitters, or other such sources of reflected radiation. If there is rapid movement during image capture, an offset between images can be difficult to determine, as the positions of features will not be the same in both images, even taking the standard image offset into account. For a device attempting to determine gaze direction based on pupil location in a set of images, the result can be inaccurate as the gaze direction and/or eye position might be different in each image.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, allows these relatively inexpensive cameras to be used as IR detectors.

Other conventional elements can be used to reduce the cost of a computing device able to perform approaches discussed herein, but might be less accurate and/or might require a larger device. For example, images can be split using beam splitters (e.g., silvered mirrors) such that half of the reflected light gets reflected to a different location (e.g., part of a sensor). Similarly, various optical elements such as an optical interferometer can be used to attempt to obtain accurate distance measurements.

As discussed with any optical approach, it can be desirable to perform at least an initial calibration procedure, as well as potentially additional and/or periodic recalibration. In one embodiment where two cameras are used, it can be advantageous to periodically capture images of a grid or similar pattern in order to calibrate for bends or physical changes in the optics. In some embodiments where an initial calibration is performed during the manufacturing process, the user might only need to have the device recalibrated when performance begins to degrade, or at any other appropriate time.

Figure 10:
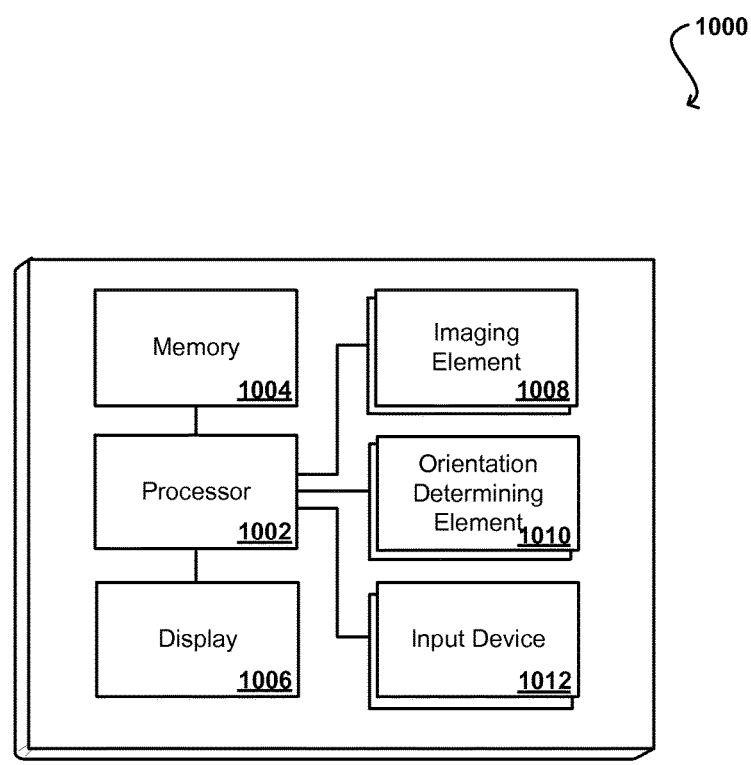
FIG. 10 illustrates components of an example computing device that can be utilized to implement aspects of the various embodiments.

FIG. 10 illustrates a set of basic components of an example computing device 1000 that can be utilized in accordance with various embodiments. The computing device can be any appropriate device able to receive and process input commands, such as a personal computer, laptop computer, television set top box, cellular phone, PDA, electronic book reading device, video game system, or portable media player, among others. In this example, the device includes a processor 1002 for executing instructions that can be stored in a memory device or element 1004. As known in the art, the device can include many types of memory, data storage or computer-readable media, such as a first data storage for program instructions for execution by the processor 1002, a separate storage for images or data, a removable memory for sharing information with other devices, etc. The device typically will include some type of display element 1006, such as a liquid crystal display (LCD), although devices such as portable media players might convey information via other means, such as through audio speakers. As discussed, the device in many embodiments will include at least one imaging element 1508 such as a camera, sensor, or detector that is able to image a facial region of a user. The imaging element can include any appropriate technology, such as a CCD imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element 1010 that is able to determine a current orientation of the device 1000. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

In some embodiments, the device can include at least one additional input device 1012 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

Figure 11:
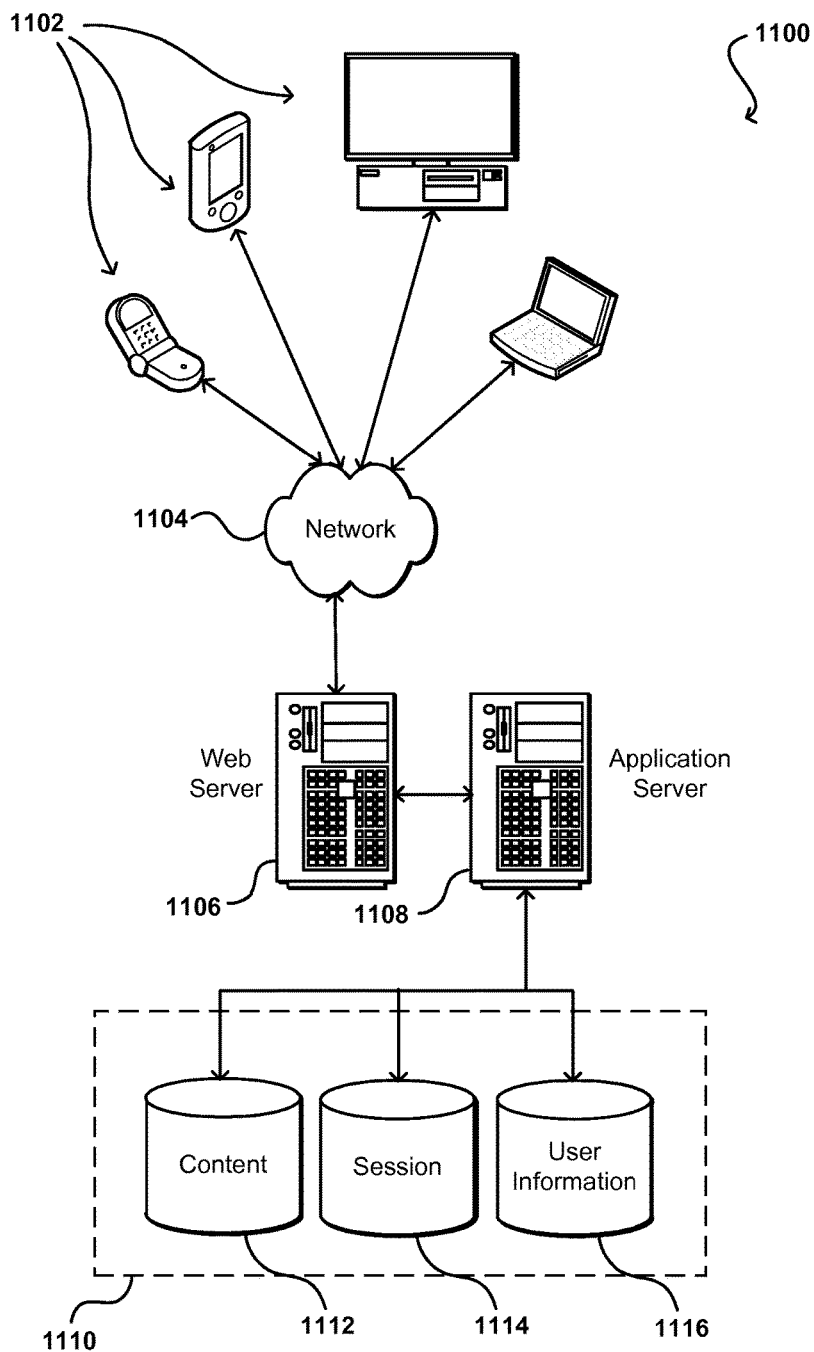
FIG. 11 illustrates an example environment in which aspects of the various embodiments can be performed.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers or cloud storage services, including without limitation those commercially available from Oracle®, Amazon®, Microsoft®, Sybase®, and IBM®, such as the Amazon Simple Storage Service (a.k.a. Amazon S3).

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other non-transitory computer-readable storage medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A virtual reality display system, comprising:
a display including a left eye region and a right eye region;
a processor; and
memory including instructions that, when executed by the processor, cause the virtual reality display system to:
obtain image data including a representation of a face of a user;
determine facial feature points based at least in part on the representation of the face in the image data;
determine, using the facial feature points, a shape of a nose of the user based at least in part on the image data;
determine, using the facial feature points, a pupillary distance of the user;
determine color data for a nose region of the image data, the nose region determined using the shape of the nose;
determine virtual reality content to be displayed by the display;
determine a left view of the nose to be displayed by the left eye region of the display, the left view determined using a left point of view of a left eye of the user, the shape of the nose, and the color data for the nose region;
determine a right view of the nose to be displayed by the right eye region of the display, the right view determined using a right point of view of a right eye of the user, the shape of the nose, and the color data for the nose region, a difference between the left eye point of view and the right eye point of view corresponding to the pupillary distance of the user; and
render the virtual reality content, left view of the nose, and right view of the nose for display.

2. The virtual reality display system of claim 1, wherein the instructions when executed further cause the virtual reality display system to:
determine a relative position of a virtual light source in the virtual reality content, wherein the left view of the nose is rendered to reflect an effect of the virtual light source on a left portion of the user's nose, and wherein the right view of the nose is rendered to reflect an effect of the virtual light source on a right portion of the user's nose.

3. The virtual reality display system of claim 2, further comprising:
a motion sensor configured to detect a change in orientation of the virtual reality display system, wherein the instructions when executed further cause the virtual reality display system to render a second left view of the nose reflecting a new effect of the virtual light source on the left portion of the nose for a new relative position of the virtual light source, and wherein a second right view of the nose is rendered that reflects a new effect of the virtual light source on the right portion of the nose for the new relative position of the virtual light source.

4. The virtual reality display system of claim 1, wherein the instructions when executed further cause the virtual reality display system to:
generate a nose model representing the shape of the nose of the user; and
generate texture data using the color data for the nose region, the color data including a base color and a map of color deviation for different locations of the nose region,
wherein rendering the left view of the nose includes determining a left point of view of the left eye, determining a view of the nose model corresponding to the left point of view, and applying the texture data to the view of the nose model.

5. The virtual reality display system of claim 1, wherein the instructions when executed further cause the virtual reality display system to:
determine, using a camera of the virtual reality display system, an expression of the user;
determine a second shape of the nose of the user corresponding to the expression;
render a second left view of the nose using the second shape; and
render a second right view of the nose using the second shape.

6. A computer-implemented method, comprising:
under control of one or more computer systems configured with executable instructions,
determining virtual reality content to be displayed to a user;
obtaining image data including a representation of the user;
determining a nose model for the user, the nose model based at least in part on the image data and including three-dimensional data representing a shape of a nose of the user;
determining appearance data for the nose of the user based at least in part on the image data;
determining a left view of the nose, the left view determined using a left point of view of a left eye of the user, the nose model, and the appearance data;
determining a right view of the nose, the right view determined using a right point of view of a right eye of the user, the nose model, and the appearance data;
causing a left view of the virtual reality content and the left view of the nose to be displayed via a left eye display of a display device; and
causing a right view of the virtual reality content and the right view of the nose to be displayed via a right eye display of the display device.

7. The computer-implemented method of claim 6, further comprising:
determining a pupillary distance of the user, wherein a difference between the left view of the nose and the right view of the nose corresponds to the pupillary distance of the user.

8. The computer-implemented method of claim 6, further comprising:
displaying a plurality of nose models;
receiving selection of the nose model from the plurality of nose models;
displaying a plurality of colors for the selected nose model; and
receiving a selection of a color of the plurality of colors, the color included in the appearance data.

9. The computer-implemented method of claim 6, further comprising:
obtaining image data including a representation of a face of the user;
determining a set of facial feature points from the representation of the face in the image data; and determining the nose model using the set of facial feature points, nose model representing a shape and size of the nose of the user.

10. The computer-implemented method of claim 9, further comprising:
determining, from the set of facial feature points, a pupillary distance of the user.

11. The computer-implemented method of claim 9, further comprising:
determining, using the set of facial feature points, a nose region of the image data;
determining a base color for the nose region, the base color representing an average intensity value for pixel locations within the nose region of the image data;
determining a variation from the base color for portion of the nose region; and
storing the base color and variation as the appearance data.

12. The computer-implemented method of claim 11, further comprising:
analyzing a second set of image data obtained with an active source of illumination;
comparing second base color and second variation data for the second set of image data against the base color and variation to determine reflectivity data for the nose; and
storing the reflectivity data as part of the appearance data.

13. The computer-implemented method of claim 11, further comprising:
displaying the left view of the nose with a level of detail corresponding to an intensity of a virtual light source.

14. The computer-implemented method of claim 6, further comprising:
determining an expression of the user;
determining a second shape of the nose of the user corresponding to the expression;
rendering a second left view of the nose using the second shape; and
rendering a second right view of the nose using the second shape.

15. A computer-implemented method, comprising:
under control of one or more computer systems configured with executable instructions,
obtaining image data including a representation of a face of a user of a virtual reality display system;
determining a set of facial feature points based at least in part on from the representation of the face in the image data;
generating a nose model using the set of facial feature points, the nose model representing a shape and a size of a nose of the user;
determining, using the set of facial feature points, a nose region of the image data;
determining appearance data for the nose of the user using values for pixel locations within the nose region of the image data; and
storing the nose model and the appearance data for rendering a virtual nose of the user with virtual reality content displayed via the virtual reality display system.

16. The computer-implemented method of claim 15, further comprising:
calculating a pupillary distance of the user based on a first location of a first feature point, of the set of facial feature points, that corresponds to a left pupil and a second location of a second feature point, of the set of facial feature points, that corresponds to a right pupil.

17. The computer-implemented method of claim 15, further comprising:
detecting motion of a headset of the virtual reality display system; and
causing a camera of the virtual reality display system to automatically capture the image data including the representation of the face while the virtual reality display system is being placed on the user.

18. The computer-implemented method of claim 16, further comprising:
determining a base color for the nose region, the base color representing an average intensity value for pixel locations within the nose region of the image data;
determining a variation from the base color for portion of the nose region; and
storing the base color and variation as the appearance data.

19. The computer-implemented method of claim 15, further comprising:
activating an illumination element of the virtual reality display system;
obtaining second image data reflecting the illumination element;
determining reflectivity data for the nose using the second image data; and
storing the reflectivity data as part of the appearance data.

20. The computer-implemented method of claim 16, further comprising:
obtaining second image data representing an expression of the user; and
determining a second nose model using the second image data, wherein the second nose model is capable of being used to render a virtual nose when the expression of the user is detected.

* * * * *